United States Patent
Wakamatsu (10) Patent No.: US 9,987,923 B2
(45) Date of Patent: Jun. 5, 2018

(54) CONTROL DEVICE FOR VEHICLE

(71) Applicant: MITSUBISHI JIDOSHA KOGYO KABUSHIKI KAISHA, Tokyo (JP)

(72) Inventor: Atsushi Wakamatsu, Tokyo (JP)

(73) Assignee: MITSUBISHI JIDOSHA KOGYO KABUSHIKI KAISHA, Tokyo (JP)

( * ) Notice: Subject to any disclaimer, the term of this patent is extended or adjusted under 35 U.S.C. 154(b) by 49 days.

(21) Appl. No.: 15/369,280

(22) Filed: Dec. 5, 2016

(65) Prior Publication Data

US 2017/0174074 A1    Jun. 22, 2017

(30) Foreign Application Priority Data

Dec. 16, 2015 (JP) .................................. 2015-245488

(51) Int. Cl.
  *B60K 15/05* (2006.01)
  *B60K 15/035* (2006.01)

(52) U.S. Cl.
  CPC ........ *B60K 15/05* (2013.01); *B60K 15/03504* (2013.01); *B60K 15/03519* (2013.01); *B60K 2015/0359* (2013.01); *B60K 2015/03514* (2013.01); *B60K 2015/0538* (2013.01); *B60K 2015/0546* (2013.01); *B60K 2015/0561* (2013.01); *B60K 2015/0576* (2013.01); *B60K 2015/0584* (2013.01)

(58) Field of Classification Search
  None
  See application file for complete search history.

(56) References Cited

U.S. PATENT DOCUMENTS

| | | | |
|---|---|---|---|
| 9,410,508 B2 | 8/2016 | Ide et al. | |
| 2014/0123962 A1 | 5/2014 | Ide et al. | |
| 2015/0226138 A1* | 8/2015 | Yang | B60K 15/035 701/22 |
| 2016/0137194 A1* | 5/2016 | Kajiwara | B60W 20/50 701/22 |

FOREIGN PATENT DOCUMENTS

| | | | |
|---|---|---|---|
| JP | 2014-92069 A | 5/2014 | |
| JP | 2015-81528 A | 4/2015 | |
| JP | 2015-123883 A | 7/2015 | |
| KR | 20160071600 A | * 6/2016 | |

* cited by examiner

*Primary Examiner* — Mussa A Shaawat
*Assistant Examiner* — Abdhesh K Jha
(74) *Attorney, Agent, or Firm* — Birch, Stewart, Kolasch & Birch, LLP (57) ABSTRACT

A vehicle includes a fuel tank, a canister, a closing valve and a filler door. A control device for the vehicle includes a valve controller that performs depressurization control for decreasing a tank pressure by opening the closing valve, a door controller that issues a normal driving command to a drive unit that opens the filler door when the tank pressure becomes equal to or lower than a predetermined pressure by the depressurization control, a detector that detects an open/close state of the filler door and a determiner that determines whether or not detection by the detector can be performed. If the detection by the detector cannot be performed, the door controller issues, when the tank pressure is equal to or lower than the predetermined pressure, a forced driving command for causing the drive unit to generate output power higher than normal power preferentially to the normal driving command.

9 Claims, 5 Drawing Sheets

CONTROL DEVICE FOR VEHICLE

CROSS-REFERENCE TO THE RELATED APPLICATION

This application incorporates by references the subject matter of Application No. 2015-245488 filed in Japan on Dec. 16, 2015 on which a priority claim is based under 35 U.S.C. § 119(a).

FIELD

The present technology relates to a control device for a vehicle that includes a closing valve interposed on a passage that connects a fuel tank and a canister.

BACKGROUND

Conventionally, an evaporation fuel treatment device is known which absorbs evaporated fuel generated in a fuel tank into a canister and purges the absorbed fuel to an intake system during operation of an engine. In particular, the evaporated fuel is sucked by the engine while it is temporarily collected by the canister thereby to prevent emission of the evaporated fuel into the atmosphere. In an engine in which such an evaporation fuel treatment device as just described is incorporated, the fuel injection amount or the intake air amount is controlled taking an evaporated fuel amount desorbed from the canister into consideration.

On the other hand, in recent years, a hybrid vehicle (PHEV, PHV) has been developed which travels principally using a driving motor while an engine is used auxiliarily. In such a hybrid vehicle as just described, in comparison with a vehicle in which only an engine is used as a power source, the operating period of the engine is short and opportunities in which evaporated fuel absorbed by the canister is purged are few. Therefore, a technology has been proposed by which a closing valve is provided on a passage that connects a fuel tank and a canister with each other and the closed state of the fuel tank is maintained as long as possible to suppress evaporation of fuel in and absorption of fuel into the canister.

For example, the internal pressure of the fuel tank tends to increase as the temperature in the tank increases and tends to decrease as the fuel amount decreases. Therefore, it seems recommendable to normally keep the closing valve in a closed state unless the internal pressure of the fuel tank exceeds a predetermined pressure. Further, if the internal pressure upon refueling into the fuel tank is higher than the atmospheric pressure, then there is the possibility that the fuel may flow back from a fuel supply port when a filler cap is opened. Therefore, also it seems recommendable to open the closing valve just before refueling is performed to depressurize the fuel tank (for example, refer to Japanese Laid-Open Patent Application No. 2015-081528 and Japanese Laid-Open Patent Application No. 2014-092069). By performing such controls as described above, evaporation of fuel in or absorption of fuel into the canister can be suppressed.

A pipe for refueling is provided for the fuel tank, and a fuel supply port at the tip end of the pipe is kept closed by a filler cap. Upon refueling, the filler cap is removed after a filler door is opened, and a fueling gun is coupled with the fuel supply port. If the refueling comes to an end, then the filler cap is attached and then the filler door is closed. The open state of the closing valve is maintained until refueling comes to an end and the filler door is closed, and, when the filler door is closed, the closing valve is closed. An open or closed state of the filler door is detected by a sensor provided in the proximity of the filler door (for example, refer to Japanese Laid-Open Patent Application No. 2015-123883). An output of the sensor is used not only as a trigger for closing the closing valve after refueling but also, for example, for indication for announcing an open or closed state of the filler door or indication for announcing a refueling possible state.

However, for example, if the sensor described above breaks down, then since the open or closed state of the filler door cannot be detected, indication for announcing a refueling possible state is not performed even if depressurization of the fuel tank is completed, and there is the possibility that this may degrade the usability. Further, where a configuration is adopted that the filler door is automatically opened after depressurization of the fuel tank, the filler door is sometimes open even if the sensor is broken down. In other words, there is the possibility that a situation may occur that the filler door is actually open although refueling possible indication is not performed, and there is the possibility that this may confuse an occupant of the vehicle.

SUMMARY

The present technology has been devised taking such a subject as described above into consideration and relates to a control device for a vehicle that includes an evaporation fuel treatment device, and it is an object of the present technology to improve the usability of the control device for a vehicle upon refueling. It is to be noted that it is another object of the present technology to not only achieve the object described above but also achieve working effects that are derived from components presented in a mode for carrying out the present technology hereinafter described and that are not achieved by conventional technologies.

In a control device for a vehicle disclosed herein, the vehicle includes a fuel tank, a canister configured to absorb evaporation fuel generated in the fuel tank, a closing valve interposed on a passage that connects the fuel tank and the canister, and a filler door provided on a body of the vehicle and configured to open and close a space to which a fuel supply port of the vehicle is exposed, and the control device includes a valve controller that carries out depressurization control for decreasing a tank pressure of the fuel tank by opening the closing valve in response to a refueling request, a door controller that issues a normal driving command to a drive unit that opens the filler door when the tank pressure becomes equal to or lower than a predetermined pressure by the depressurization control, a detector that detects an open or closed state of the filler door, and a determiner that determines whether or not a current state of the vehicle is a detectable state in which detection by the detector can be performed, wherein in a case where the determiner determines that the current state is an undetectable state in which detection by the detector cannot be performed, the door controller issues, when the tank pressure is equal to or lower than the predetermined pressure, a forced driving command for causing the drive unit to generate output power higher than normal power preferentially to the normal driving command. In other words, when the tank pressure is equal to or lower than the predetermined pressure, the forced driving command may be issued in place of the normal driving command. It is to be noted that the "tank pressure" here signifies the internal pressure of the fuel tank (pressure of a gas).

In the undetectable state (detection impossible state) of a vehicle in which an open or closed state of the filler door cannot be detected, when the tank pressure is equal to or lower than the predetermined pressure, the forced driving command for generating higher output power than normal output power is issued. Therefore, the filler door can be opened steadily. Consequently, even if the current state is the undetectable state, a state in which refueling can be performed can be established. Therefore, the usability can be improved.

BRIEF DESCRIPTION OF DRAWINGS

The nature of this invention, as well as other objects and advantages thereof, will be explained in the following with reference to the accompanying drawings, in which like reference characters designate the same or similar parts throughout the figures and wherein:

FIGS. 3A to 3D are diagrams illustrating a relationship between an open or closed state of the filler door and a sensor output, wherein FIG. 3C illustrates an intermediate state upon opening of the filler door and FIG. 3D illustrates an open state of the filler door;

DESCRIPTION OF EMBODIMENTS

In the following, a control device for a vehicle as an embodiment is described with reference to the drawings. The embodiment hereinafter described is illustrative to the end, and there is no intention to eliminate various modifications and applications of the technology not demonstrated in the embodiment hereinafter described. The configuration in the present embodiment can be carried out in various modified forms without departing from the scope of the embodiment. Further, the configuration can be selected as occasion demands or can be combined suitably.

[1. Device Configuration]

Figure 1:
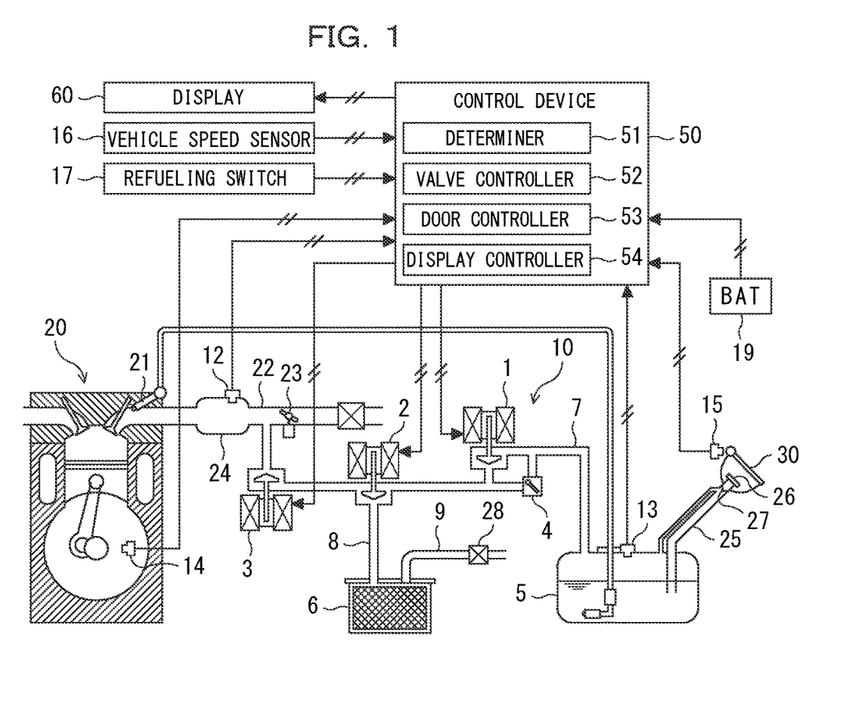
FIG. 1 is a diagram illustrating a configuration of a vehicle to which an evaporation fuel treatment device is applied and a control device.

A configuration of a vehicle to which an evaporation fuel treatment device of a present embodiment is applied is exemplified in FIG. 1. The vehicle is a hybrid vehicle that includes an electric vehicle (EV) mode in which the vehicle travels by driving force of a driving motor and a hybrid electric vehicle (HVC) mode in which the vehicle travels using (or jointly using) driving force of an engine 20. Upon operation of the engine 20, fuel is sucked from the inside of a fuel tank 5 by a pump, and an amount of fuel that depends upon a traveling state of the vehicle is injected from an injector 21. Further, the intake air amount is controlled by a throttle valve 23 interposed on an intake passage 22.

[1-1. Evaporation Fuel Treatment Device]

A purge passage 10 for collecting evaporated fuel generated in the fuel tank 5 by a canister 6 and introducing the evaporated fuel into an intake system is provided for the engine 20. The purge passage 10 includes a tank passage 7 for coupling the fuel tank 5 and the intake system of the engine 20 with each other and a canister passage 8 formed branching from the tank passage 7 toward the canister 6. One end of the tank passage 7 is coupled, for example, with a portion of the fuel tank 5 in the proximity of the ceiling face or an upper portion of a side face of the fuel tank 5, and the other end of the tank passage 7 is coupled with the intake passage 22. The coupling position of the tank passage 7 is set to the downstream side (side near to a cylinder of the engine 20) with respect to the throttle valve 23. Further, one end of the canister passage 8 is coupled with an upper face of the canister 6, and the other end of the canister passage 8 is coupled with the tank passage 7 so as to form a junction of three passages. As described above, the evaporation fuel treatment device according to the present embodiment includes at least the canister 6 and the purge passage 10 for purging absorbed fuel in the canister 6 to the intake system during operation of the engine 20.

The purge passage 10 includes a closing valve 1, a bypass valve 2 and a purge valve 3 interposed thereon as valves for controlling the flow of gas in the passage.

The closing valve 1 is an electromagnetic control valve for closing the fuel tank 5 and is disposed at a position nearer to the fuel tank 5 than the branching point between the tank passage 7 and the canister passage 8. The closing valve 1 is controlled fundamentally so as to normally close the tank passage 7 and functions so as to maintain the closed state of the fuel tank 5. In other words, the fuel tank 5 is configured as a closed type tank by the closing valve 1. The closing valve 1 is opened upon refueling to depressurize the fuel tank 5. Further, the closing valve 1 is temporarily opened also when the internal pressure of the fuel tank 5 becomes excessively high during operation of the engine 20. The closing valve 1 in the present embodiment is a two-position switching valve that performs an on-off operation (opening operation or closing operation) in response to a control signal.

The bypass valve 2 is an electromagnetic control valve for opening or blocking the canister passage 8 and is disposed at the branching point between the tank passage 7 and the canister passage 8. The bypass valve 2 is opened when evaporated fuel is to be absorbed by the canister 6 or when the evaporated fuel absorbed by the canister 6 is to be purged (while canister purge is being performed). The bypass valve 2 in the present embodiment is controlled in an open state during stopping of the engine 20. If the closing valve 1 is opened in this state, then the evaporated fuel in the fuel tank 5 is absorbed by the canister 6. Further, basically the bypass valve 2 is opened if the closing valve 1 is closed during operation of the engine 20 and purges the evaporated fuel absorbed by the canister 6. Similarly to the closing valve 1, the bypass valve 2 in the present embodiment is a two-position switching valve that performs an on-off operation in response to a control signal.

The purge valve 3 is an electromagnetic valve for opening or blocking the tank passage 7 with respect to the intake passage 22 and is disposed at a position nearer to the intake passage 22 than the branching point between the tank passage 7 and the canister passage 8. The purge valve 3 is controlled basically so as to open the tank passage 7 to the intake passage 22 during operation of the engine 20. During stopping of the engine 20, the purge valve 3 is controlled so as to close the tank passage 7. The purge valve 3 in the present embodiment is a variable opening control valve that opens the tank passage 7 with an opening in accordance with the magnitude of the control signal. The opening of the purge valve 3 can be set in response to an operation state of the engine 20, an amount of the evaporated fuel absorbed by the canister 6, an amount of fuel remaining in the fuel tank 5 and so forth.

As depicted in FIG. 1, an atmosphere open passage 9 for coupling the canister 6 and the outside with each other is attached to the upper face of the canister 6. The atmosphere open passage 9 functions as a depressurization passage when the evaporated fuel is to be absorbed by the canister 6 and functions as an external air intake passage when the evaporated fuel absorbed by the canister 6 is allowed to flow out to the intake passage 22. Further, an air filter 28 is interposed in the atmosphere open passage 9, and foreign substances in the external air is removed by the air filter 28.

Further, a relief valve 4 is interposed on a detour passage formed so as to detour the closing valve 1 to couple the upstream side and the downstream side of the closing valve 1 with each other. The relief valve 4 is a safety valve for defining an upper limit value $P_{MAX}$ to the internal pressure of the fuel tank 5. When the pressure in the tank passage 7 at the fuel tank 5 side with respect to the closing valve 1 is equal to or lower than the predetermined upper limit value $P_{MAX}$, the relief valve 4 is placed into a closed state. On the other hand, if the pressure in the tank passage 7 at the fuel tank 5 side with respect to the closing valve 1 exceeds the upper limit value $P_{MAX}$, then the relief valve 4 is opened to depressurize the fuel tank 5. Consequently, the internal pressure of the fuel tank 5 can be suppressed from increasing exceeding the upper limit value $P_{MAX}$.

Further, a refueling passage 25 is provided for the fuel tank 5, and a fuel supply port 25a (refer to FIG. 2) at the tip end of the refueling passage 25 is closed by a filler cap 26. Further, the refueling passage 25 extends to the inner side of a filler door 30 (hereinafter referred to as "door 30"). Upon refueling, after the door 30 is opened, the filler cap 26 is operated to turn so as to be removed. Further, a check valve 27 for preventing back flow of fuel or outflow of gas (hereinafter referred to as "fuel vapor") containing evaporated fuel is provided for the refueling passage 25. The check valve 27 functions so as to permit inflow of fluid from the outside of the vehicle in a direction toward the fuel tank 5 but block outflow of fluid in the opposite direction.

[1-2. Filler Door Device]

Figure 2:
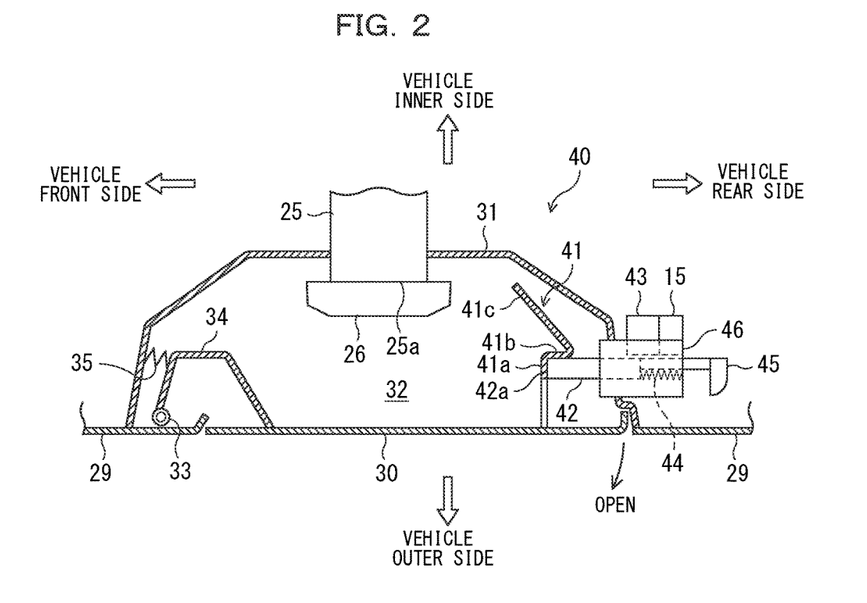
FIG. 2 is a transverse sectional view illustrating a locked state of a filler door.

FIG. 2 is a transverse sectional view illustrating a locked state of the door 30 provided on a vehicle body side face 29 and additionally depicts a filler door device 40 that opens or closes the door 30. The door 30 is placed in a locked state (state where the door 30 is closed and locked) as depicted in FIG. 2 except upon refueling, and the locked state is automatically cancelled if a refueling switch 17 provided in a cabin is operated into an on state.

The door 30 opens and closes an opening of a housing 31 fixed to the inner side of the vehicle body side face 29. The housing 31 has a box shape with one side face opened and is fixed so as to open toward the outer side. A refueling space 32 is formed between the door 30 and the housing 31. The fuel supply port 25a extends through the housing 31 and is provided in a projecting manner in the refueling space 32. In this manner, the door 30 opens and closes the refueling space 32 in which the fuel supply port 25a is exposed. A shaft 33 is fixed at the inner side of the vehicle body side face 29 in front of the door 30 and extends in an upward and downward direction. A bracket 34 is fixed to the back face (face directed toward the inner side) of the door 30 and coupled for pivotal motion with the shaft 33. Consequently, the door 30 is supported for pivotal motion on the shaft 33 through the bracket 34. A door spring 35 (biasing part) is provided between the bracket 34 and the housing 31. The door spring 35 is a member for normally biasing the door 30 in an opening direction.

The filler door device 40 is a device that maintains the door 30 in a locked state and opens the door 30 in response to a refueling request of the occupant. The filler door device 40 includes a restricting part 41 fixed to the door 30, a locking part 42 provided in a casing 46 fixed to a rear portion of the housing 31, a motor 43 (driving unit), a spring 44 and a lever 45.

The restricting part 41 is a member for cooperating with the locking part 42 to maintain the door 30 in a locked state, and is fixed to the inner side of a rear portion of the door 30 and disposed in the refueling space 32. The restricting part 41 is formed by bending so as to have three flat face portions extending in an upward and downward direction. A first flat face portion 41a extends in a vehicle widthwise direction at the most outer side position and is abutted with a front end face 42a of the locking part 42. A third flat face portion 41c extends obliquely at the most inner side with respect to the vehicle widthwise direction so as to be directed forwardly toward the inner side. When the door 30 is opened, a front edge portion of the locking part 42 is abutted with the third flat face portion 41c. The front edge portion and a rear edge portion of the third flat face portion 41c are positioned forwardly and rearwardly with respect to the first flat face portion 41a, respectively. A second flat face portion 41b couples an inner edge portion of the first flat face portion 41a and the rear edge portion of the third flat face portion 41c with each other and extends in a vehicle forward and rearward direction. The second flat face portion 41b is abutted with a side face of the locking part 42.

The locking part 42 is a bar-like member extending toward the front of the vehicle from the casing 46 and is slidably supported on the casing 46 in the vehicle forward and rearward direction. The motor 43 moves the locking part 42 rearwardly in accordance with a driving command from a control device 50 hereinafter described to open the door 30. The locking part 42 in the present embodiment has two positions set as positions (retracted positions) to which it is moved by the motor 43, and the locking part 42 moves to the positions corresponding to two different driving commands from the control device 50. The spring 44 is provided between a rear face of the casing 46 and a rear end face of the locking part 42 and normally biases the locking part 42 toward the front of the vehicle. The lever 45 is an operation unit for unlocking the door 30 by manual operation thereof and is coupled with a rear end of the locking part 42. In other words, the door 30 in the present embodiment is configured so as to be unlocked also by a manual operation. If the door 30 is unlocked, then this is opened by the biasing force of the door spring 35. It is to be noted that the door 30 is closed if it is pushed in a closing direction by a manual operation and is locked if it is pushed to a fully closed position.

Figure 3A:
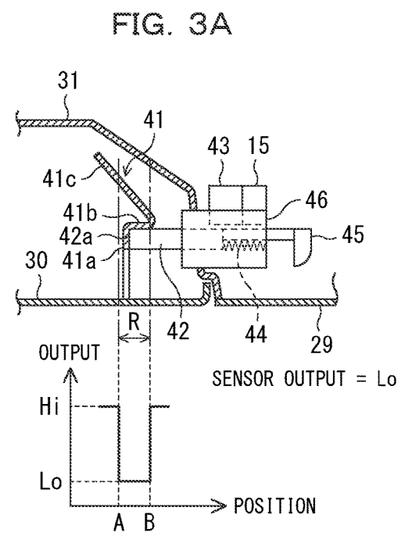
FIG. 3A illustrates a locked state of the filler door.

As depicted in FIGS. 2 and 3A, the locking part 42 places the door 30 into a locked state by abutment of the side face thereof with the second flat face portion 41b of the restricting part 41. In other words, the locking part 42 limits the movement of the restricting part 41 to the outer side (locks the restricting part 41), and maintains the door 30 in the locked state against the biasing force of the door spring 35. It is to be noted that forward movement of the locking part 42 is limited by abutment thereof with the first flat face portion 41a of the restricting part 41.

Figure 3B:
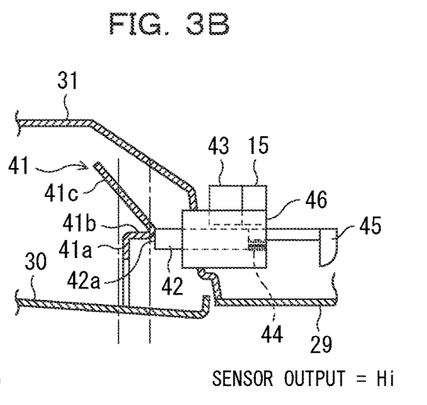
FIG. 3B illustrates an unlocked state.

If a switching on operation of the refueling switch 17 is performed, then it is determined that a refueling request is issued from the occupant and the motor 43 is rendered operative. Consequently, as depicted in FIG. 3B, the locking part 42 is moved rearwardly against the biasing force of the spring 44. If the tip end of the locking part 42 is moved rearwardly farther than the restricting part 41, then the locking between the locking part 42 and the restricting part 41 is cancelled (unlocking is performed), and the door 30 begins to open by the biasing force of the door spring 35.

Figure 3C:
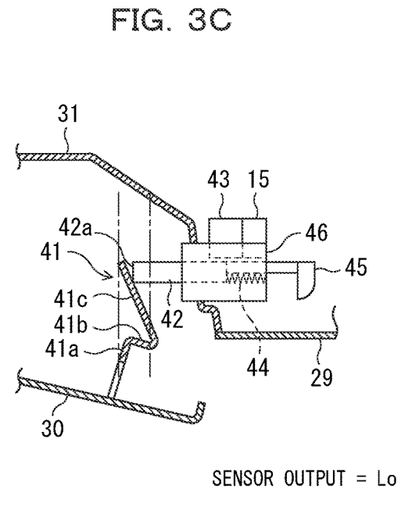
Figure 3D:
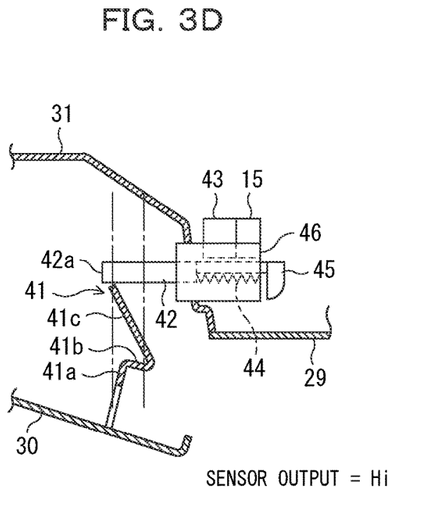

The motor 43 stops when the locking is cancelled (or released). Consequently, the locking part 42 is pushed to return forwardly by the biasing force of the spring 44 as depicted in FIG. 3C. At this time, the locking part 42 moves in abutment with the third flat face portion 41c of the restricting part 41 and thereby functions so as to push out the door 30 in the opening direction through the restricting part 41. If the restricting part 41 is moved to the outer side with respect to the locking part 42 as depicted in FIG. 3D, then the door 30 is placed into an open state. At this time, the locking part 42 is placed in a fully extended state by the biasing force of the spring 44. It is to be noted that, if the door 30 is moved in the closing direction by the occupant, then the restricting part 41 pushes in the locking part 42. Then, if the second flat face portion 41b is moved to the inner side with respect to the locking part 42, then the locking part 42 is projected and the door 30 is placed into the locking state illustrated in FIG. 3A.

Figure 4A:
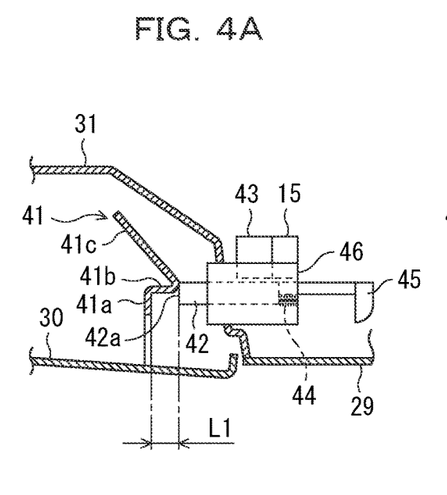
FIG. 4A is a diagram illustrating a movement length of a locking part in accordance with a normal driving command.

If a normal driving command is transmitted from the control device 50, then the motor 43 moves the locking part 42 rearwardly by a predetermined movement amount L1 (hereinafter referred to as "normal movement length L1") as depicted in FIG. 4A. The normal movement length L1 is set in advance, for example, to a length equal to or a little greater than the length of the second flat face portion 41b of the restricting part 41 in the forward and rearward direction. The motor 43 maintains the state in which the locking part 42 is moved rearwardly by the normal movement length L1 during a period within which the normal driving command continues to be issued from the control device 50.

Figure 4B:
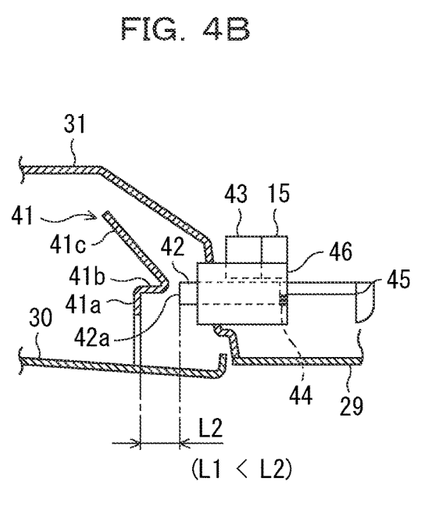
FIG. 4B is a diagram illustrating a movement length of the locking part in accordance with a forced driving command.

If a driving command (hereinafter referred to as "forced driving command") different from the normal driving command is issued from the control device 50, then the motor 43 moves the locking part 42 by a predetermined movement amount L2 (hereinafter referred to as "forced movement length L2") as depicted in FIG. 4B. The forced movement length L2 is set in advance so as to be greater than the normal movement length L1 and sufficiently greater than the length of the second flat face portion 41b of the restricting part 41 in the forward and rearward direction. The motor 43 maintains the state in which the locking part 42 is moved rearwardly by the forced movement length L2 during a period within which the forced driving command continues to be issued from the control device 50.

A door sensor 15 (detector) for detecting an open or closed state of the door 30 is provided on the casing 46. The door sensor 15 in the present embodiment indirectly detects the open or closed state of the door 30 by outputting two different voltage values based on the projecting position of the locking part 42. In particular, as depicted in FIG. 3A, the door sensor 15 outputs a low voltage Lo when the front end face 42a of the locking part 42 is positioned within a range R but outputs a high voltage Hi when the front end face 42a is positioned without the range R.

The range R is sandwiched by a first position A and a second position B. The first position A is a position rather forward from the first flat face portion 41a of the restricting part 41 when the door 30 is in the locked state. However, the first position A is a position behind the front end face 42a of the locking part 42 in the state in which the restricting part 41 is moved to the outer side with respect to the locking part 42. In other words, if the locking part 42 is removed from the restricting part 41 and placed into a fully extended state, then since the front end face 42a of the locking part 42 is positioned forwardly from the first position A, it can be detected whether or not the door 30 is placed in a fully open state (state depicted in FIG. 3D). Further, the second position B is a position rather forward from the rear edge portion of the second flat face portion 41b of the restricting part 41. However, the second position B is a position sufficiently in the rear of the first position A. In other words, if the locking part 42 is placed in a pulled-in state from the restricting part 41, then since the front end face 42a of the locking part 42 is positioned in the rear with respect to the second position B, it can be detected whether or not the door 30 is in a state in which the locking of the door 30 is cancelled (state depicted in FIG. 3B).

Since the door sensor 15 has such an output characteristic as described above, if the state of the door 30 varies from the locked state of FIG. 3A to the open state of FIG. 3D, then the sensor output successively varies to the low voltage Lo, high voltage Hi, low voltage Lo and high voltage Hi. It is to be noted that, while the order of the high voltage Hi and the low voltage Lo may be changed, if the output of the door sensor 15 in the locked state of the door 30 (namely, if the front end face 42a of the locking part 42 is within the range R) is set to the low voltage Lo, then the power consumption can be suppressed low. The high voltage Hi is, for example, a voltage value of a battery 19, and the low voltage Lo is, for example, a voltage value a little higher than zero but sufficiently lower than the high voltage Hi. It is to be noted that the battery 19 is a vehicle-carried battery used as a power supply to various sensors 12 to 17 hereinafter described.

[1-3. Detection System, Control System and so Forth]

The opening or closing state (opening degree) of each of the closing valve 1, bypass valve 2 and purge valve 3 described above is controlled by the control device 50 that functions as a computer. The control device 50 is an electronic device in which processors such as a central processing unit (CPU), a micro processing unit (MPU) or the like, a read only memory (ROM), a random access memory (RAM), a nonvolatile memory and so forth are integrated. The processor here is, for example, a processing device (processor) in which a control unit (control circuit), an arithmetic operation unit (arithmetic operation circuit), a cache memory (register) and so forth are built. Further, the ROM, RAM and nonvolatile memory are memory devices in which a program or data during working is stored. Contents of the control performed by the control device 50 are recorded as firmware or an application program into the ROM, the RAM, the nonvolatile memory or a removable medium. Further, upon execution of the program, the contents of the program are developed in a memory space in the RAM and are executed by the processor.

As depicted in FIG. 1, an intake manifold pressure sensor 12, a tank pressure sensor 13, an engine speed sensor 14, the door sensor 15, a vehicle speed sensor 16 and the refueling switch 17 are connected to the control device 50. The intake manifold pressure sensor 12 detects an internal pressure of a surge tank 24 provided at the downstream side with respect to the throttle valve 23 in the intake passage 22 as "intake manifold pressure PIM (intake system pressure)". Here, the pressure (magnitude of a negative pressure) in the proximity of the coupling location between the intake passage 22 and the tank passage 7 is detected.

The tank pressure sensor 13 detects an internal pressure of the fuel tank 5 (pressure of a gas) as "tank pressure P". The tank pressure sensor 13 is attached to a position over a liquid surface of the fuel. Further, the engine speed sensor 14 detects a speed of rotation of the engine 20 (engine speed Ne). The vehicle speed sensor 16 detects a vehicle speed V. The refueling switch 17 is a switch to be operated to an on state by the occupant and detects a refueling request from the occupant.

Information detected by the various sensors 12 to 17 is transmitted to the control device 50. It is to be noted that the pressures detected by the intake manifold pressure sensor 12 and the tank pressure sensor 13 may be absolute pressures or gauge pressures with reference to the atmospheric pressure $P_{ATM}$.

Further, a display 60 (display unit) is provided in the cabin and controlled in accordance with a command from the control device 50. The display 60 displays several kinds of information relating to the vehicle such as the vehicle speed V, a fuel remaining amount and the open or closed state of the door 30 thereon.

[2. Contents of Control]

The control device 50 in the present embodiment performs refueling control when a refueling request is detected. The refueling control is control for placing the vehicle into a refueling possible state in accordance with a refueling request and placing the fuel tank 5 into a closed state after the refueling work. In the refueling control, four kinds of control including depressurization control, door control, closing control and displaying control are performed.

[2-1. Depressurization Control]

The depressurization control is control for opening the closing valve 1 and the bypass valve 2 to depressurize the fuel tank 5 such that the internal pressure of the fuel tank 5 does not excessively increase in comparison with the atmospheric pressure $P_{ATM}$. The depressurization control is started just before refueling into the fuel tank 5. In particular, if a switching on operation of the refueling switch 17 is performed, then the depressurization control is started. At this time, the purge valve 3 is controlled into a closed state.

By opening the closing valve 1 and the bypass valve 2, a flow of air toward the outside is generated through the atmosphere open passage 9 of the canister 6 from the fuel tank 5. Consequently, the tank pressure P of the fuel tank 5 decreases and evaporated fuel existing in the fuel tank 5 and the purge passage 10 is collected by the canister 6. It is to be noted that the depressurization control is ended when the closing control is started. In particular, the depressurization state of the fuel tank 5 is maintained until the closing control is started after a switching on operation of the refueling switch 17 is transmitted. The state just described of the closing valve 1, bypass valve 2 and purge valve 3 is maintained until at least the closing control is started.

[2-2. Door Control]

The door control is control for opening the door 30 by the motor 43 when the tank pressure P of the fuel tank 5 becomes equal to or lower than a predetermined pressure $P_0$ by the depressurization control. The predetermined pressure $P_0$ is set in advance, for example, to a value substantially equal to the atmospheric pressure $P_{ATM}$. In this control, the normal driving command is issued to the motor 43 first. If an open state of the door 30 is detected by the door sensor 15 before a predetermined time period T1 (hereinafter referred to as "first time period T1") elapses after issuance of the normal driving command is started, then the door control is ended. The first time period T1 is set in advance, for example, to a time period assumed to be required after operation of the motor 43 is started until locking of the locking part 42 and the restricting part 41 is cancelled. Further, the first time period T1 is set to a sufficiently short time period shorter than an upper limit value to the energization time period to the motor 43. The upper limit value to the energization time period is set from a constraint to the door part (motor 43).

On the other hand, if the open state of the door 30 is not detected before the first time period T1 elapses after issuance of the normal driving command is started, then the normal driving command is stopped and the forced driving command is issued for a predetermined time period T2 (hereinafter referred to as "second time period T2") instead. The second time period T2 in the present embodiment is set in advance to such a time period that it is longer than the first time period T1 and the time period obtained by adding the first time period T1 and the second time period T2 has a value lower than the upper limit value described hereinabove. In particular, in this case, also the forced driving command is issued after the normal driving command is issued. This is because, even in a state in which the open state of the door 30 is not detected, the door 30 can be opened steadily such that the occupant can perform a refueling work.

As described above, the filler door device 40 in the present embodiment moves the locking part 42 rearwardly by the motor 43 to unlock the restricting part 41 thereby to open the door 30. If the normal driving command is issued, then the locking part 42 moves rearwardly by the normal movement length L1, and therefore the front end face 42a will ride over the restricting part 41 to cancel the locking. When the open state of the door 30 is detected, it can be confirmed that the locking is cancelled after the normal driving command is issued. Therefore, if it is recognized that the locking is not cancelled, then such a procedure can be performed to announce the occupant to perform a switching on operation of the refueling switch 17 again.

However, if the open state of the door 30 is not detected, then also it cannot be confirmed naturally whether or not the locking is cancelled. Therefore, in this case, a command (forced driving command) for generating output power higher than normal output power is issued to the motor 43 in place of the normal driving command (preferentially to the normal driving command) such that the motor 43 generates output power higher than normal output power. Further, in the present embodiment, if the forced driving command is issued, then the motor 43 outputs output power of the magnate for a time period longer than a normal time period. In particular, the locking is cancelled steadily by moving the locking part 42 rearwardly further such that the front end face 42a of the locking part 42 is positioned rearwardly by the forced movement length L2 from the position in the locked state and then maintaining this state for the second time period T2. Consequently, even when the open state of the door 30 is not detected, an opportunity for a refueling work is suppressed from being lost.

The case in which the open state of the door 30 is not detected may be a case in which the locking part 42 is caught by the casing 46 or the second flat face portion 41b or another case in which the door sensor 15 is broken down (disconnection of an electric circuit, disconnection of a harness or the like). In such a case as just described, also the closed state of the door 30 cannot be detected naturally. Such a state that the open or closed state of the door 30 cannot be detected as just described is hereinafter referred to as "undetectable state". On the other hand, a normal state in which the open or closed state of the door 30 can be detected by the door sensor 15 is hereinafter referred to as "detectable state".

[2-3. Closing Control]

The closing control is control for closing the closing valve 1 to prevent outflow of evaporated fuel generated in the fuel tank 5. The closing control is performed after an end of the refueling operation. In particular, the closing valve 1 opened in the depressurization control is closed to place the fuel tank 5 into the closed state again. In the case of the detectable state, the closing valve 1 is closed when the closed state of the door 30 is detected. On the other hand, since the closed state of the door 30 is not detected in the undetectable state, the closing valve 1 is closed when at least one of two conditions described just below is satisfied.

=Closing Conditions of Closing Valve 1 (in Undetectable State)=

1. A predetermined time period Tth elapses after a switching on operation of the refueling switch 17
2. Traveling is started (vehicle velocity V>0)

The predetermined time period Tth of the condition 1 is a period of time (for example, approximately ten and several minutes to several tens of minutes) longer than a period of time expected to require until, where it is assumed that the occupant is to perform refueling operation, the operation comes to an end. In particular, in the undetectable state, even if the occupant performs a refueling operation, the closing valve 1 is closed when it is considered that the operation comes to an end. In other words, the open state of the closing valve 1 is maintained until it becomes considered that the refueling operation comes to an end.

[2-4. Display Control]

The display control is control for displaying an indication for announcing the refueling possible state or an indication of the open state of the door 30 or the like on the display 60 to inform the occupant of information relating to the refueling. This control is performed in an interlocking relationship with the depressurization control, door control and closing control described above. In particular, if the depressurization control is started, then an indication for announcing waiting for a refueling operation (hereinafter referred to as "waiting indication") is displayed on the display 60.

Then, if the door 30 is opened by the door control and the open state is detected, then an indication for announcing the refueling possible state (hereinafter referred to as "refueling possible indication") is displayed on the display 60. It is to be noted that an indication for announcing that the door 30 is open (hereinafter referred to as "door open indication") may be displayed on the display 60 together with the refueling possible indication. On the other hand, if it is determined in the door control that the current state is the undetectable state, then only the refueling possible indication is displayed on the display 60 after issuance of the forced driving command. It is to be noted that, when the refueling possible indication is displayed, the waiting indication is not displayed. Further, if the closing control is performed, then the refueling possible indication is erased and, if the door open indication is displayed, then also this indication is erased.

[3. Control Configuration]

As the control configuration for carrying out the refueling control described above, a determiner 51, a valve controller 52, a door controller 53 and a display controller 54 are provided in the control device 50. The components just described exhibit part of functions of programs to be executed by the control device 50 and are implemented by software. However, part or all of the functions may be implemented by hardware (electronic controlling circuit) or may be implemented using both of software and hardware.

The determiner 51 determines whether or not detection by the door sensor 15 can be performed. In particular, the determiner 51 determines whether the current state of the vehicle is the detectable state or the undetectable state. The determiner 51 in the present embodiment determines that the current state is the undetectable state if the door sensor 15 is in a breakdown state but determines that the current state is the detectable state if the door sensor 15 is not in a breakdown state. The determiner 51 transmits a result of the determination to the valve controller 52 and the display controller 54. Further, if the determiner 51 determines that the current state is the detectable state, then it records information of the determination (for example, what condition leads to the determination that the current state is the detectable state or the like) as diagnostic information into the control device 50. Consequently, the maintainability of the vehicle can be improved.

The door sensor 15 may be determined as being in a breakdown state, for example, when the output from the door sensor 15 is not transmitted, when the output value of the door sensor 15 is abnormal (namely, when the output value is neither the high voltage Hi nor the low voltage Lo, for example, when the output value is zero) and when contents of the instruction to the motor 43 and the sensor output do not coincide with each other. The case in which the instruction contents and the sensor output do not coincide with each other includes, for example, the case in which the sensor output does not exhibit the high voltage Hi upon energization of the motor 43 (upon issuance of the normal driving command). In particular, although the locking part 42 should originally move to the position depicted in FIG. 3B, the sensor output does not become equal to the high voltage Hi when a breakdown that the correlational position between the locking part 42 and the door sensor 15 is displaced occurs or when a non-driving breakdown that the motor 43 does not operate occurs. In those cases, it is determined that the current state is the undetectable state. Further, the case in which the instruction contents and the sensor output do not coincide with each other includes, for example, the case in which, when the motor 43 is switched from on to off (when, after the normal driving command is issued, the command is stopped), the sensor output remains the high voltage Hi and does not vary. In particular, although the locking part 42 should originally move to the position depicted in FIG. 3C or 3D, if the spring 44 breaks down, then the locking part 42 is not pushed back to return and the sensor output does not vary. Therefore, it is determined that the current state is the detectable state.

The valve controller 52 performs the depressurization control and the closing control described above. In particular, if the valve controller 52 receives a switching on operation of the refueling switch 17, then it performs depressurization of the fuel tank 5 by controlling the closing valve 1 and the bypass valve 2 to the open state and controlling the purge valve 3 to the closed state. The valve controller 52 maintains the open or closed state of the closing valve 1, bypass valve 2 and purge valve 3 as it is until the closing control is started (the depressurization state is maintained).

Further, the valve controller 52 changes the starting time point of the closing control (closing timing of the closing valve 1) in response to a result of the determination transmitted from the determiner 51. In particular, if it is determined by the determiner 51 that the current state is the detectable state, then the valve controller 52 controls the closing valve 1 to the closed state when the closed state of the door 30 is detected. On the other hand, if it is determined by the determiner 51 that the current state is the undetectable state, then the valve controller 52 controls the closing valve 1 to the closed state when at least one of the conditions 1 and 2 described above is satisfied. It is to be noted that the valve controller 52 controls the open or closed state of the bypass valve 2 and the purge valve 3 in response to the operation state of the engine 20 after the closing valve 1 is closed, the amount of evaporated fuel absorbed by the canister 6 or the like.

The door controller 53 performs the door control described above. In particular, when the tank pressure P detected by the tank pressure sensor 13 decreases to a pressure equal to or lower than the predetermined pressure $P_0$ after the depressurization control is started by the valve controller 52, the door controller 53 issues the normal driving command to the motor 43. At this time, if the current state is a state in which the open state of the door 30 can be detected (namely, the detectable state), then the sensor output of the door sensor 15 successively varies to the low voltage Lo, high voltage Hi, low voltage Lo and high voltage Hi. However, in a state in which the open state of the door sensor 15 cannot be detected (namely, the undetectable state), the sensor output does not vary in this order. Therefore, when a first variation from the low voltage Lo to the high voltage Hi is transmitted from the door sensor 15, the door controller 53 determines that the open state of the door 30 can be detected and stops the normal driving command. On the other hand, if the first variation from the low voltage Lo to the high voltage Hi is not transmitted from the door sensor 15 and the door controller 53 continues to issue the normal driving command until the issuance time period reaches the first time period T1, then the door controller 53 changes over the command from the normal driving command to the forced driving command. In this case, when the issuance time period of the forced driving command reaches the second time period T2, the door controller 53 stops the issuance of the forced driving command.

The display controller 54 performs the display control described above. In particular, if the depressurization control is started by the valve controller 52, then the display controller 54 displays the waiting indication on the display 60. Further, if it is determined by the determiner 51 that the current state is the detectable state, then the display controller 54 displays the refueling possible indication on the display 60 when the open state of the door 30 is detected by the door sensor 15. It is to be noted that, as described above, the door open indication may be displayed together with the refueling possible indication. On the other hand, if it is determined by the determiner 51 that the current state is the undetectable state, then the display controller 54 displays the refueling possible indication when the forced driving command by the door controller 53 is stopped. Then, if the closing control is started by the valve controller 52, then the display controller 54 erases the indications.

[4. Flow Chart]

Figure 5:
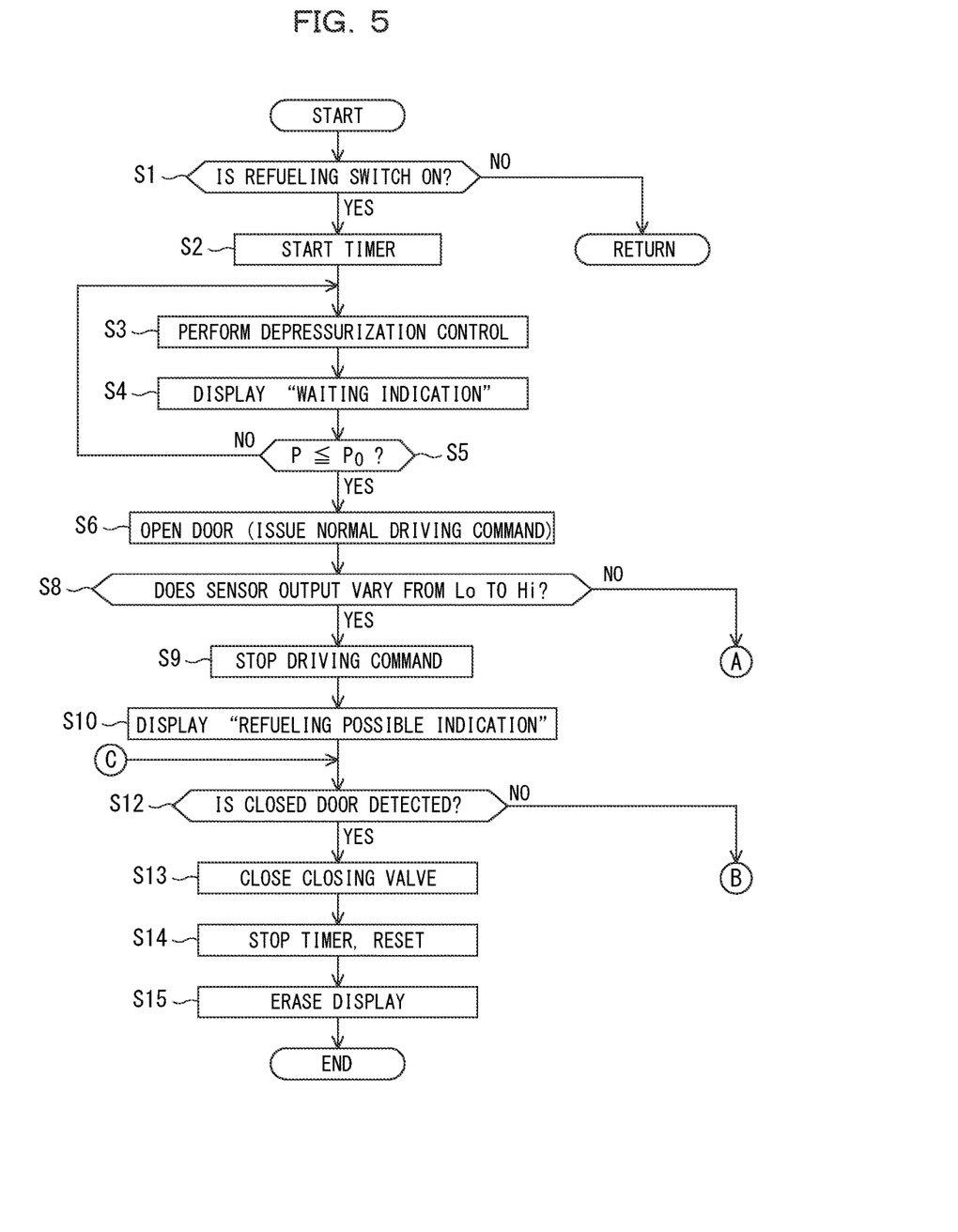
FIGS. 5 and 6 are flow charts illustrating an example of a procedure of refueling control.
Figure 6:
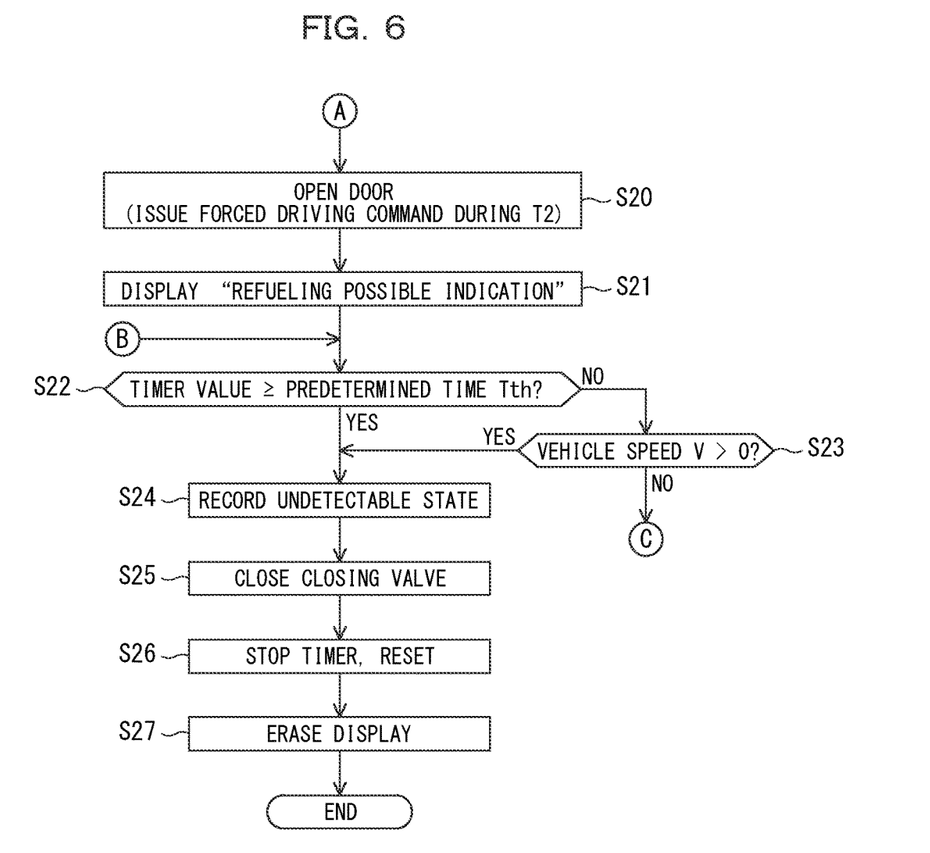

FIGS. 5 and 6 are flow charts exemplifying a control procedure for performing the refueling control described above. FIG. 5 corresponds to control contents principally in the detectable state, and FIG. 6 corresponds to control contents principally in the undetectable state. The procedure illustrated in FIG. 5 is performed during stopping of the vehicle.

If a switching on operation of the refueling switch 17 is performed while the engine 20 stops (step S1), then measurement by a timer is started first (step S2). Then, depressurization control is started by the valve controller 52 (step S3). In particular, the closing valve 1 and the bypass valve 2 are controlled to an open state and the purge valve 3 is controlled to a closed state to start depressurization of the fuel tank 5. At this time, a waiting indication is displayed on the display 60 (step S4). Then, if the tank pressure P becomes equal to or lower than the predetermined pressure $P_0$ (step S5), then issuance of the normal driving command from the door controller 53 to the motor 43 is started (step S6).

At step S8, it is determined whether or not the sensor output has varied from the low voltage Lo to the high voltage Hi. If the sensor output has varied (namely, if unlocking of the door 30 is confirmed), then since the door sensor 15 is normal, the normal driving command is stopped (step S9) and a refueling possible indication is displayed on the display 60 (step S10). From the indication, the occupant can know that a refueling operation is possible. It is to be noted that, when the door sensor 15 is normal, subsequently to the variation of the sensor output at step S8 (the variation from the low voltage Lo to the high voltage Hi), the sensor output successively varies to the high voltage Hi, low voltage Lo and high voltage Hi.

On the other hand, if the sensor output has not varied at step S8 (namely, if unlocking of the door 30 is not confirmed), then it is determined by the determiner 51 that the current state is the undetectable state, and the processing advances to step S20 of FIG. 6. At step S20, the forced driving command is issued from the door controller 53 to the motor 43. Consequently, the sensor output varies from the low voltage Lo to the high voltage Hi. Then, when the second time period T2 elapses after the issuance of the forced driving command is started, the forced driving command is stopped and the sensor output successively varies to the high voltage Hi, low voltage Lo and high voltage Hi. Further, the refueling possible indication is displayed on the display 60 (step S21). From the indication, the occupant can know that a refueling operation can be performed.

At step S12 of FIG. 5, it is determined whether or not the closed state of the door 30 is detected. For example, it is determined whether or not the sensor output has varied from the high voltage Hi to the low voltage Lo by a manual operation by the occupant. If the closed state of the door 30 is not detected (if the sensor output remains the high voltage Hi and does not vary), the processing advances to step S22 of FIG. 6. At step S22, it is determined whether or not the value of the timer whose measurement was started at step S2 is equal to or higher than the predetermined time period Tth.

If the timer value is lower than the predetermined time period Tth, then it is determined whether or not the vehicle speed V is higher than zero (namely, whether or not traveling is started) (step S23). At this time, if a refueling operation is being performed, then since the vehicle remains stopping, the processing returns to the determination at step S12. If the refueling operation comes to an end, then the door 30 is closed by the occupant. In this case, if the closed state of the door 30 is detected at step S12 (namely, if the current state is the detectable state), then the closing valve 1 is closed by the valve controller 52 (step S13). Then, the timer is stopped and the counting is reset (step S14), and the indications on the display 60 are erased (step S15) and then the processing flow is ended.

On the other hand, if the timer value becomes equal to or higher than the predetermined time period Tth (step S22) before the closed state of the door 30 is detected at step S12 or if traveling is started (step S23), then it is determined by the determiner 51 that the current state is the undetectable state and information of this is recorded as diagnostic information into the control device 50 (step S24). Further, the closing valve 1 is closed by the valve controller 52 (step S25). Then, the timer is stopped and the counting is reset (step S26), and the indications on the display 60 are erased (step S27) and then the processing flow is ended.

[5. Effect]

(1) In the control device 50 described above, if it is determined by the determiner 51 that the current state is the undetectable state, then the forced driving command for causing the motor 43 to generate higher output power than normal output power is issued preferentially to the normal driving command (is issued in place of the normal driving command). Therefore, the door 30 can be opened steadily. Consequently, even if the current state is the undetectable state, the vehicle can be placed into the refueling possible state, and the usability can be improved thereby.

It is to be noted that it may seem recommendable to take a countermeasure to continue, when it is determined by the determiner 51 that the current state is the undetectable state, to issue the normal driving command. However, as described hereinabove, where general door parts are used, there is a constraint to the energization time period to the motor 43 (the upper limit value to the energization time period). Therefore, the energization cannot be continued exceeding the upper limit value. In contrast, by issuing, when it is determined that the current state is the undetectable state, the forced driving command to the motor 43 preferentially to the normal driving command, the door 30 can be opened steadily while suppressing the energization time period. Further, since general door parts can be used, also increase of the cost can be suppressed.

(2) The filler door device 40 described above includes the locking part 42 that maintains the locked state of the door 30 against the biasing force for biasing the door 30 in the opening direction, and the locking of the door 30 can be cancelled by the motor 43 moving the locking part 42. Since such a configuration as described above is applied, by issuing the forced driving command for generating higher output power than normal output power, even if the current state is a state in which the locking is not cancelled by the normal driving command, the locking can be cancelled to open the door 30 steadily (the possibility that the door 30 may be opened can be increased).

(3) When the forced driving command is issued from the door controller 53, the motor 43 sets a longer time period for which the locking part 42 is to be maintained in a moved state than that when the normal driving command is issued. In particular, when the forced driving command is issued, the motor 43 maintains the state in which the locking part 42 is moved rearwardly as it is until the second time period T2 longer than the first time period T1 elapses. Therefore, the locking of the locking part 42 and the restricting part 41 can be made easier to cancel than that in a normal state, and consequently, the door 30 can be opened steadily.

(4) Further, when the forced driving command is issued from the door controller 53, the motor 43 increases the movement amount of the locking part 42 from that when the normal driving command is issued. In particular, when the forced driving command is issued, the motor 43 moves the locking part 42 rearwardly by the forced movement length L2 longer than the normal movement length L1. Therefore, the locking of the locking part 42 and the restricting part 41 can be made easier to cancel than that in a normal state, and consequently, the door 30 can be opened steadily.

(5) If the current state when refueling comes to an end is the undetectable state, then the valve controller 52 closes the closing valve 1, which has been opened in response to a refueling request, when the predetermined time period Tth elapses from a time point of the refueling request (namely, a point of time at which a switching on operation of the refueling switch 17 was performed). In particular, according to the control device 50 described above, since the closing valve 1 remains open until the predetermined time period Tth elapses from the time point of the refueling request, the refueling possible state can be maintained suitably. Further, if the predetermined time period Tth elapses, then it is regarded that "refueling has ended" and the closing valve 1 is closed. Therefore, such a situation can be avoided that the fuel tank 5 is not closed any more. Accordingly, the usability can be improved while the closing properties of the fuel tank 5 are assured.

(6) Further, if the current state when refueling comes to an end is the undetectable state, then the valve controller 52 closes the closing valve 1, which has been opened in response to a refueling request, when traveling of the vehicle is started. In particular, according to the control device 50 described above, since the closing valve 1 remains open before traveling is started after the depressurization control is started, the refueling possible state can be maintained in the maximum. Further, if traveling is started, then the closing valve 1 is closed assuming that "refueling has ended". Therefore, such a situation can be avoided that the fuel tank 5 is not closed any. Accordingly, the usability can be enhanced while the closing properties of the fuel tank 5 are assured.

(7) If the forced driving command is transmitted to the motor 43 by the door controller 53, then the display controller 54 displays the refueling possible indication on the display 60. Therefore, even if the current state is the undetectable state, it is possible to announce the occupant that refueling is possible. Consequently, if the door 30 is opened, then the occupant can perform refueling. On the other hand, if the door 30 is not opened, then an inconsistent situation occurs that the door 30 is not opened in spite that the refueling possible indication is displayed. Therefore, it is possible to allow the occupant to recognize that there is something wrong with the vehicle.

(8) If it is determined by the determiner 51 that the current state is the detectable state, then the valve controller 52 closes the closing valve 1, which has been opened in response to a refueling request, when a closed state of the door 30 is detected. Therefore, the time period for which the refueling possible state continues can be suppressed to the minimum and the closed state of the fuel tank 5 can be created together with completion of the refueling. Consequently, the amount of evaporated fuel absorbed by the canister 6 can be suppressed.

[6. Modification]

In the embodiment described above, a case is exemplified in which, when the current state is the undetectable state, the forced driving command continues to be issued during the second time period T2 longer than the normal time period and the locking part 42 is moved rearwardly by the forced movement length L2 longer than the normal length. However, contents of the control (operation state of the motor 43) in the undetectable state are not limited to this.

For example, the motor 43 may be configured such that it operates not only during a time period within which a driving command continues to be issued but only during a predetermined time period (first time period T1 or second time period T2) from a time point at which a driving command is issued. In this case, the door controller 53 may not continue to issue the command for the predetermined time period. Further, if the motor 43 generates higher output power than normal output power when the forced driving command is received, then the time period within which the motor 43 maintains the locking part 42 in the state in which the locking part 42 is moved rearwardly may be set to the first time period T1 equal to the normal time period, or the motor 43 may move the locking part 42 rearwardly by the movement length L1 equal to the normal length.

The conditions for closing the closing valve 1 opened in response to a refueling request in the undetectable state are not limited to the two conditions described above. For example, it may be set as a closing condition for the closing valve 1 that, for example, operation of the engine 20 is started.

Further, contents of the indication to be displayed on the display 60 are not limited to those described hereinabove. For example, a configuration may be applied in which, if it is determined that the current state is the undetectable state, then this state may be indicated so as to be announced to the occupant.

The configuration of the evaporated fuel treatment device described hereinabove is an example and is not limited to that described above. For example, the depressurization control and the closing control may be performed by providing a depressurization passage for decompression of the tank pressure P separately from the purge passage 10 and controlling an open or closed state of a second closing valve interposed on the depressurization passage. In this case, by opening the second closing valve when a refueling request is issued, the fuel tank 5 can be decompressed and a state in which a refueling operation can be performed can be established. Further, although the closing valve 1 and the bypass valve 2 in the embodiment described above are two-position switching valves and the purge valve 3 is a variable opening control valve, the type of the valves can be changed arbitrarily.

The configuration of the filler door device 40 described above is an example and is not limited to that described above. For example, the locking part 42 may not be moved forwardly by the biasing force of the spring 44, but the motor 43 may move the locking part 42 also forwardly. Further, the door sensor 15 for detecting the open or closed state of the door 30 may be configured so as to directly detect a movement of the door 30.

REFERENCE SIGNS LIST

1 closing valve
2 bypass valve
3 purge valve
5 fuel tank
6 canister
10 purge passage
15 door sensor (detector)
20 engine
30 door (filler door)
35 door spring (biasing part)
40 filler door device
42 locking part
43 motor (driving unit)
50 control device
51 determiner
52 valve controller
53 door controller
54 display controller
60 display (display unit)

The invention thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A control device for a vehicle, the vehicle comprises a fuel tank, a canister configured to absorb evaporation fuel generated in the fuel tank, a closing valve interposed on a passage that connects the fuel tank and the canister, and a filler door provided on a body of the vehicle and configured to open and close a space to which a fuel supply port of the vehicle is exposed;
the control device comprising:
a valve controller that carries out depressurization control for decreasing a tank pressure of the fuel tank by opening the closing valve in response to a refueling request;
a door controller that issues a normal driving command to a drive unit that opens the filler door when the tank pressure becomes equal to or lower than a predetermined pressure by the depressurization control;
a detector that detects an open or closed state of the filler door; and
a determiner that determines whether or not a current state of the vehicle is a detectable state in which detection by the detector can be performed;
wherein in a case where the determiner determines that the current state is an undetectable state in which detection by the detector cannot be performed, the door controller issues, when the tank pressure is equal to or lower than the predetermined pressure, a forced driving command for causing the drive unit to generate output power higher than normal power preferentially to the normal driving command.

2. The control device according to claim 1,
wherein the vehicle comprises a biasing part configured to bias the filler door in an opening direction and a filler door device having a locking part configured to maintain a locking state of the filler door against biasing force of the biasing part; and
the drive unit cancels the locking of the filler door by moving the locking part.

3. The control device according to claim 2, wherein, when the forced driving command is issued from the door controller, the drive unit prolongs a time period during which the locking part is maintained in a moved state in comparison with that when the normal driving command is issued.

4. The control device according to claim 2, wherein, when the forced driving command is issued from the door controller, the drive unit increases a movement amount of the locking part in comparison with that when the normal driving command is issued.

5. The control device according to claim 3, wherein, when the forced driving command is issued from the door controller, the drive unit increases a movement amount of the locking part in comparison with that when the normal driving command is issued.

6. The control device according to claim 1, wherein, if the current state is the undetectable state upon ending of refueling, the valve controller closes the closing valve when a predetermined time period elapses from a time point at which the refueling request is issued.

7. The control device according to claim 1, wherein, if the current state is the undetectable state upon ending of refueling, the valve controller closes the closing valve upon starting of traveling of the vehicle.

8. The control device according to claim 1, further comprising a display controller that controls, when the forced driving command is issued from the door controller, a display unit to display a state in which refueling can be performed.

9. The control device according to claim 1, wherein, when the determiner determines that the current state is the detectable state, the valve controller closes the closing valve, which has been opened in response to the refueling request, when a closed state of the filler door is detected by the detector.

* * * * *